(12) United States Patent
Fuente (10) Patent No.: US 7,669,024 B2
(45) Date of Patent: *Feb. 23, 2010

(54) STORAGE SYSTEM WITH MULTIPLE COPY TARGETING

(75) Inventor: Carlos F Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/062,825

(22) Filed: Apr. 4, 2008

(65) Prior Publication Data

US 2008/0189482 A1 Aug. 7, 2008

Related U.S. Application Data

(63) Continuation of application No. 11/287,691, filed on Nov. 28, 2005, now Pat. No. 7,386,695.

(30) Foreign Application Priority Data

Dec. 23, 2004 (GB) ................... 0428108.5

(51) Int. Cl.
*G06F 12/16* (2006.01)

(52) U.S. Cl. .................. 711/162; 711/161; 711/165; 704/204

(58) Field of Classification Search .................. 711/161, 711/162, 204

See application file for complete search history.

(56) References Cited

U.S. PATENT DOCUMENTS 6,820,180 B2    11/2004    McBreaty et al.
6,976,039 B2*    12/2005    Chefalas et al. ............. 707/204
7,165,141 B2    1/2007    Cochran et al.

* cited by examiner

*Primary Examiner*—Jack A Lane
(74) *Attorney, Agent, or Firm*—Lieberman & Brandsdorfer, LLC (57) ABSTRACT

A storage controller, cooperable with host computer apparatus, and a plurality of controlled storage apparatus, comprises a host write component operable to write a data object to a source data image at one of the plurality of controlled storage apparatus; a first copy component responsive to a first metadata state and operable to control copying of the data object to a first target data image at one of the plurality of controlled storage apparatus; a second copy component responsive to a second metadata state and operable to perform one of: controlling copying of the data object to a second target data image at one of the plurality of controlled storage apparatus; and causing the first copy component to perform copying of the second target data image to the first target data image.

16 Claims, 7 Drawing Sheets

FIGURE 7

STORAGE SYSTEM WITH MULTIPLE COPY TARGETING

CROSS REFERENCE TO RELATED APPLICATION(S)

This application is a continuation of application Ser. No. 11/287,691, filed on Nov. 28, 2005, now pending, which is hereby incorporated herein by reference, and which claims the benefit of foreign application number 0428108.1, filed on Dec. 23, 2004 in Great Britain.

FIELD OF THE INVENTION

The present invention relates to the field of computer storage systems, and particularly to advanced function storage systems providing a FlashCopy®, a registered trademark of International Business Machines Corporation, function or the equivalent.

BACKGROUND OF THE INVENTION

In the field of computer storage systems, there is increasing demand for what have come to be described as "advanced functions". Such functions go beyond the simple I/O functions of conventional storage controller systems. Advanced functions are well known in the art and depend on the control of metadata used to retain state data about the real or "user" data stored in the system. The manipulations available using advanced functions enable various actions to be applied quickly to virtual images of data, while leaving the real data available for use by user applications. One such well-known advanced function is FlashCopy.

At the highest level, FlashCopy is a function where a second image of 'some data' is made available. This function is sometimes known in other system contexts as Point-In-Time copy, or T0-copy. The second image's contents are initially identical to that of the first. The second image is made available 'instantly'. In practical terms this means that the second image is made available in much less time than would be required to create a true, separate, physical copy, and that this means that it can be established without unacceptable disruption to a using application's operation.

Once established, the second copy can be used for a number of purposes including performing backups, system trials and data mining. The first copy continues to be used for its original purpose by the original using application. Contrast this with backup without FlashCopy, where the application must be shut down, and the backup taken, before the application can be restarted again. It is becoming increasingly difficult to find time windows where an application is sufficiently idle to be shut down. The cost of taking a backup is increasing. There is thus significant and increasing business value in the ability of FlashCopy to allow backups to be taken without stopping the business.

FlashCopy implementations achieve the illusion of the existence of a second image by redirecting read I/O addressed to the second image (henceforth Target) to the original image (henceforth Source), unless that region has been subject to a write. Where a region has been the subject of a write (to either Source or Target), then to maintain the illusion that both Source and Target own their own copy of the data, a process is invoked which suspends the operation of the write command, and without it having taken effect, issues a read of the affected region from the Source, applies the read data to the Target with a write, then (and only if all steps were successful) releases the suspended write. Subsequent writes to the same region do not need to be suspended since the Target will already have its own copy of the data. This copy-on-write technique is well known and is used in many environments.

All implementations of FlashCopy rely on a data structure which governs the decisions discussed above, namely, the decision as to whether reads received at the Target are issued to the Source or the Target, and the decision as to whether a write must be suspended to allow the copy-on-write to take place. The data structure essentially tracks the regions or grains of data that have been copied from source to target, as distinct from those that have not. In its simplest form, this data structure is maintained in the form of a bitmap showing which grains have been written to, and which are untouched by write activity.

Some storage controllers allow a user to configure more than one target for a given source. This has a number of applications. For instance, different experiments could be run against each of the targets. Or the targets might be taken at different times (e.g. different days in the week), and allow historical access to the disk, perhaps for the purpose of recovering from some data corruption, such as might be caused by a virus.

Figure 1:
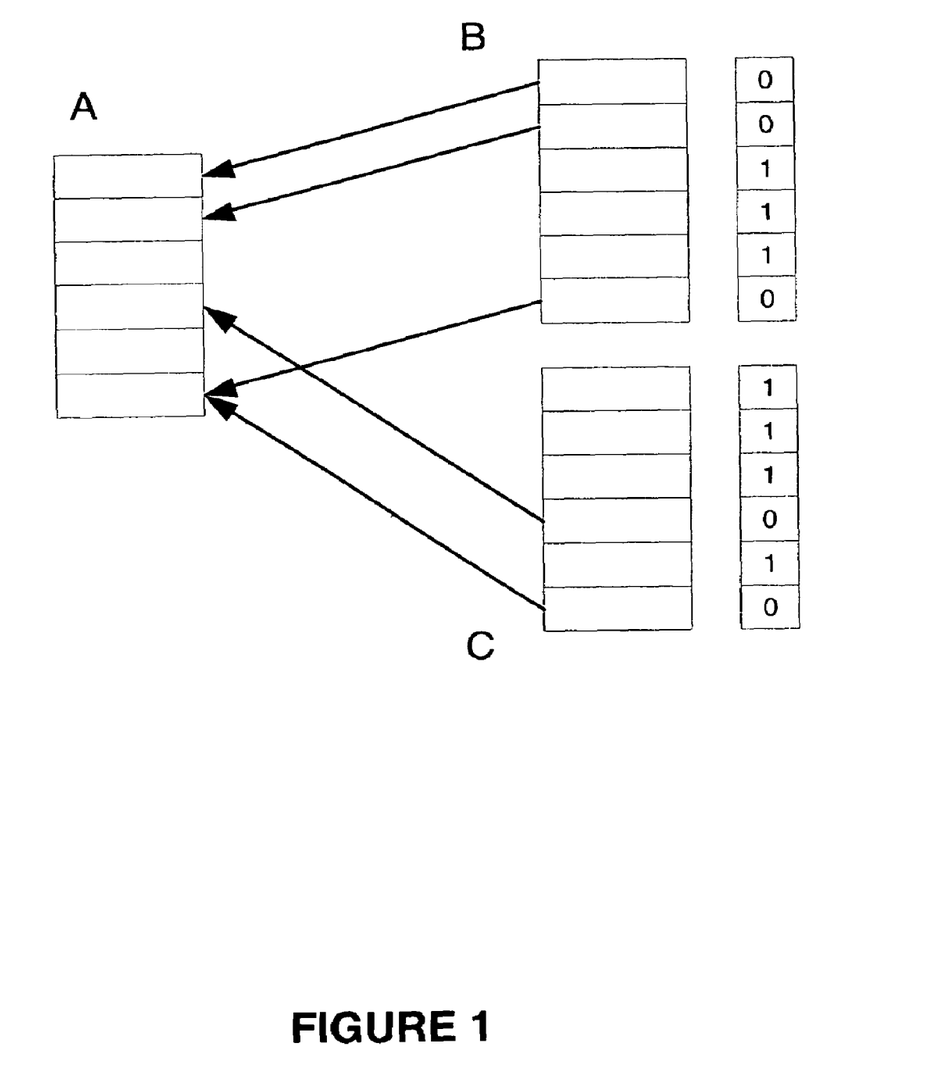
FIG. 1 shows a prior art data arrangement having multiple parallel targets.

Existing implementations of multiple target FlashCopy extend the FlashCopy algorithm, by configuring the disks as shown in FIG. 1, where A is a source LOGICAL UNIT, and B and C show two targets that were taken at some time in the past. A, B and C can each be updated. The arrows show grains (fixed sized regions of the disk) which are still dependent on the source LOGICAL UNIT. These have corresponding bits of '0b' in the bitmap which tracks the progress of each Flash-Copy.

This conventional algorithm simply arranges the multiple targets in parallel, and operates the original FlashCopy algorithm over each mapping in turn.

However, there is a drawback with the conventional algorithm for managing a multiple FlashCopy arrangement in that writes to a grain in the source might cause copying of multiple grains (one in each relationship). The last grain in the above example would be one. This causes extra processing and latency, and limits the scalability of the prior art multiple FlashCopy arrangement, and hence its usability. Accordingly, there is a need for a solution that mitigates processing and latency associated with management of a multiple FlashCopy arrangement.

SUMMARY OF THE INVENTION

The present invention relates to a method and system for managing a plurality of data images of a storage controller in communication with a host computer apparatus.

In one aspect of the invention, a storage controller is provided. The storage controller includes a host write computer operable to write a data object to a source data image at one of a plurality of controlled storage apparatus. In addition, the storage controller includes a first copy component and a second copy component. The first copy component is responsive to a first metadata state and is operable to control copying of the data image to a first target data image at one of the plurality of controlled storage apparatus. The second copy component is responsive to a second metadata state and is operable to perform one of the following steps: controlling copying of the data object to a second target image at one of the plurality of controlled storage apparatus, and causing the first copy component to perform copying of the second target data image to the first target data image.

In another aspect of the invention, a computer program product is provided with a computer useable medium having computer useable program code for operating a storage controller. The computer program product includes code for writing a data object to a source data image at one of a plurality of controlled storage apparatus. In addition, code is provided for copying the data object to a first target data image at one of the plurality of controlled storage apparatus responsive to a first metadata state, and for performing one of the following steps in response to a second metadata state: controlled copying of the data object to a second target data image at one of the plurality of controlled storage apparatus, and causing copying of the second target data image to the first target data image.

In a further aspect of the invention, a tool is provided for managing a storage controller. The tool includes instructions for writing a data object to a source data image at one of a plurality of controlled storage apparatus. In addition, the tool includes instructions responsive to a first metadata state for copying the data object to a first target data image at one of the controlled storage apparatus, and instructions responsive to a second metadata state for performing one of the following steps: controlled copying of the data object to a second target data image at one of the plurality of controlled storage apparatus, and copying of the second target data image to the first target data image.

BRIEF DESCRIPTION OF THE DRAWINGS

The present invention will now be described by way of example only, with reference to the accompanying drawings, in which.

DETAILED DESCRIPTION OF THE PREFERRED EMBODIMENTS

Figure 2:
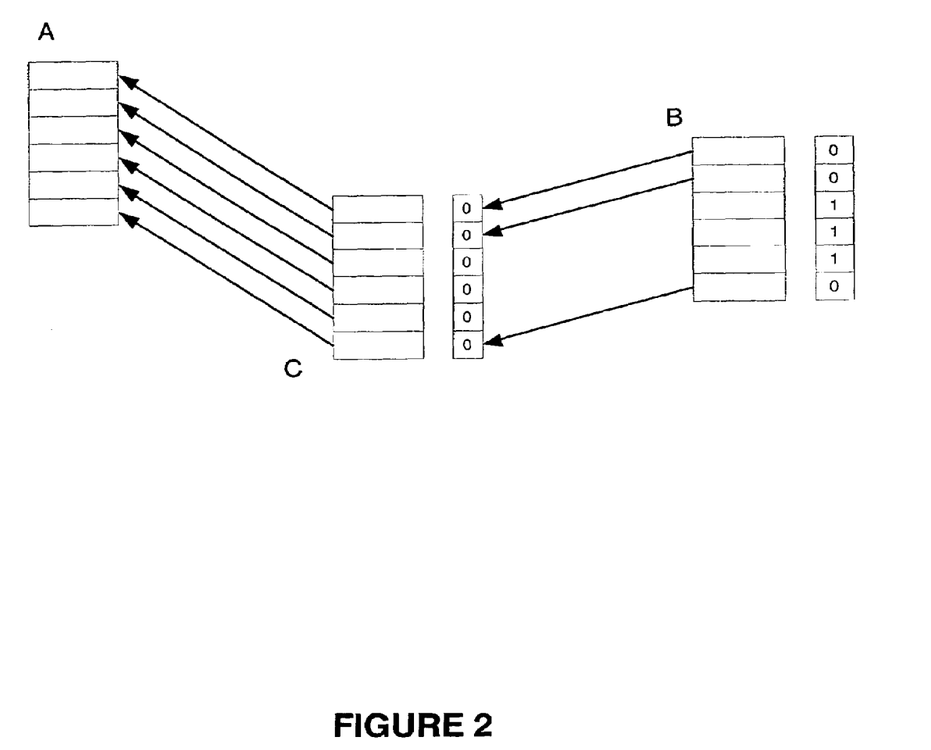
FIG. 2 shows an initial data arrangement in which one embodiment of the present invention may be applied.

Suppose that A and B are already in a FlashCopy relationship, and C is added as a copy of A. At the point that the image C is established, the relationships can be arranged as shown in FIG. 2.

In effect, B is established as a copy of C (which is at this instant identical to A), and C is a copy of A.

The bitmap held by B that described its differences from A also correctly describes its difference from C. C is identical to A, and has an empty bitmap.

Updates to A now only require a copy operation to copy data from A to C. Conversely, updates to C require two copy operations, from A to C, and from C to B. This is because updates to the middle of a chain force a copy to the relationships on either side.

Figure 3:
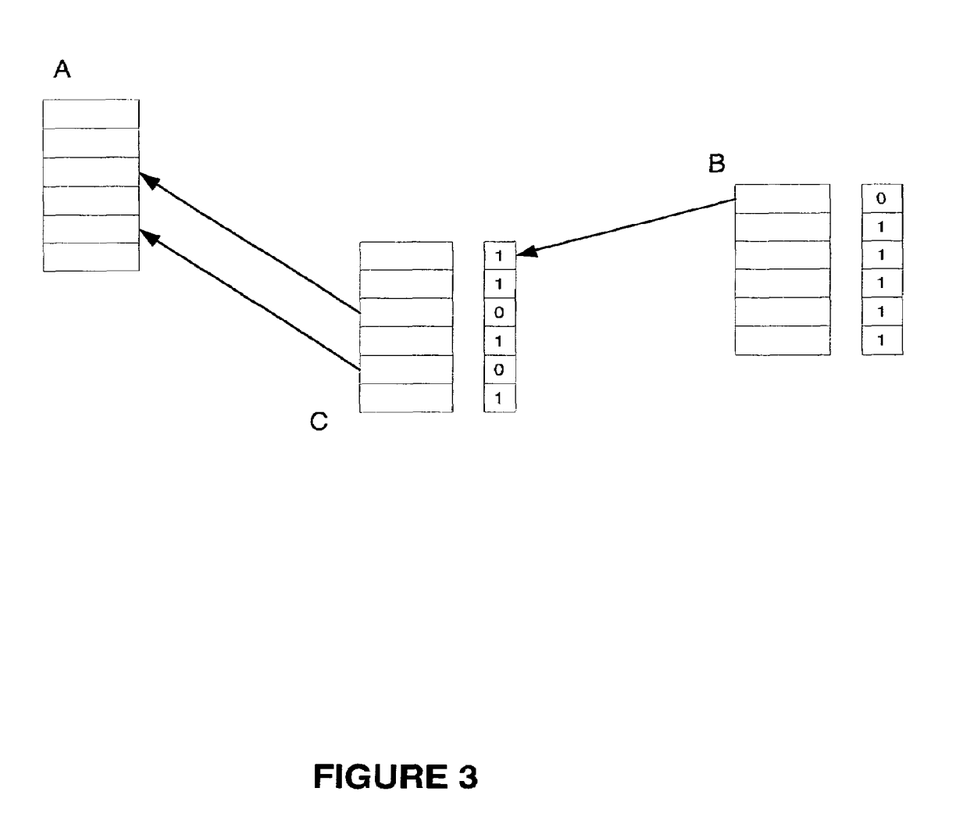
FIG. 3 shows an updated data arrangement in which one embodiment of a first level of the present invention has been applied.

For instance, taking the arrangement of FIG. 2, if we apply updates to the first and fourth grains in A, and the second and 6th grains in C, the outcome is as depicted in FIG. 3.

To extend the FlashCopy structure to include more than 3 disks requires an iterative arrangement using the base scheme described above, in which the case for any triad of one source and two target disks is as described above, and thus the number of host I/Os required is always bounded at three.

Figure 4A:
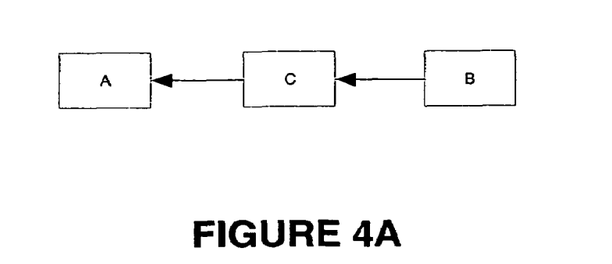
FIG. 4A shows a simplified view of the data arrangement of FIGS. 2 and 3.

FIG. 4A shows the 2 mappings of FIGS. 2 and 3, but in a simplified form, ignoring, for the time being, the grains and corresponding bits in the bitmaps.

Figure 4B:
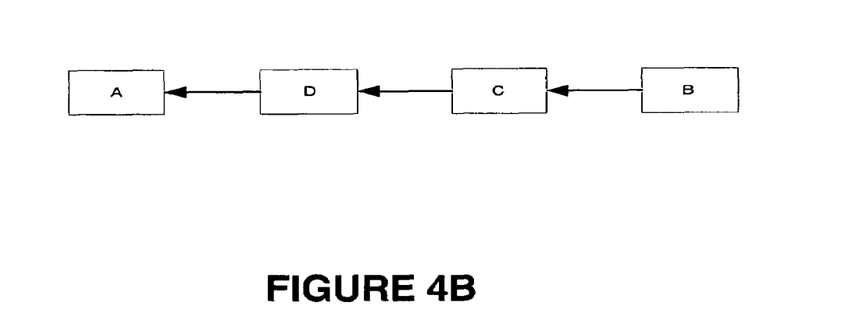
FIG. 4B shows a view of the data arrangement of FIG. 4A into which a further target has been introduced.

Taking a third image of A involves inserting a fourth disk (D) between A and C, as shown in FIG. 4B.

Figure 4C:
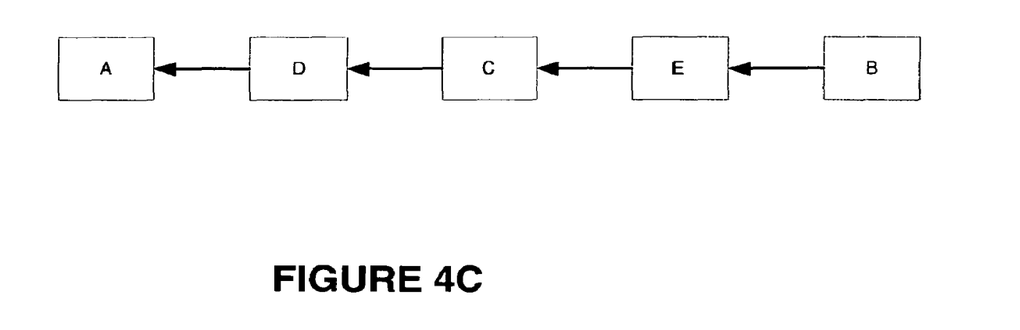
FIG. 4C shows a view of the data arrangement of FIG. 4A into which a yet further target has been introduced.

Taking an image of C (a cascaded FlashCopy) can be achieved by inserting E between C and B, as shown in FIG. 4C.

The principal challenge in any cascaded scheme is implementing target reads efficiently, and avoiding deadlocks in lock processing. A target read needs to lock all uncopied grains against updates, until it finds the appropriate generation source.

Re-triggering a relationship requires removing it from the chain, and reinserting it behind its original source. (The identity of the original source needs to be preserved, as well as the current place in the chain, to maintain the management model).

There is a further difficulty to be addressed in the case of the removal of a relationship from the middle of the chain, if the mappings further down have a dependency on it (or on relationships further up the chain).

Figure 5:
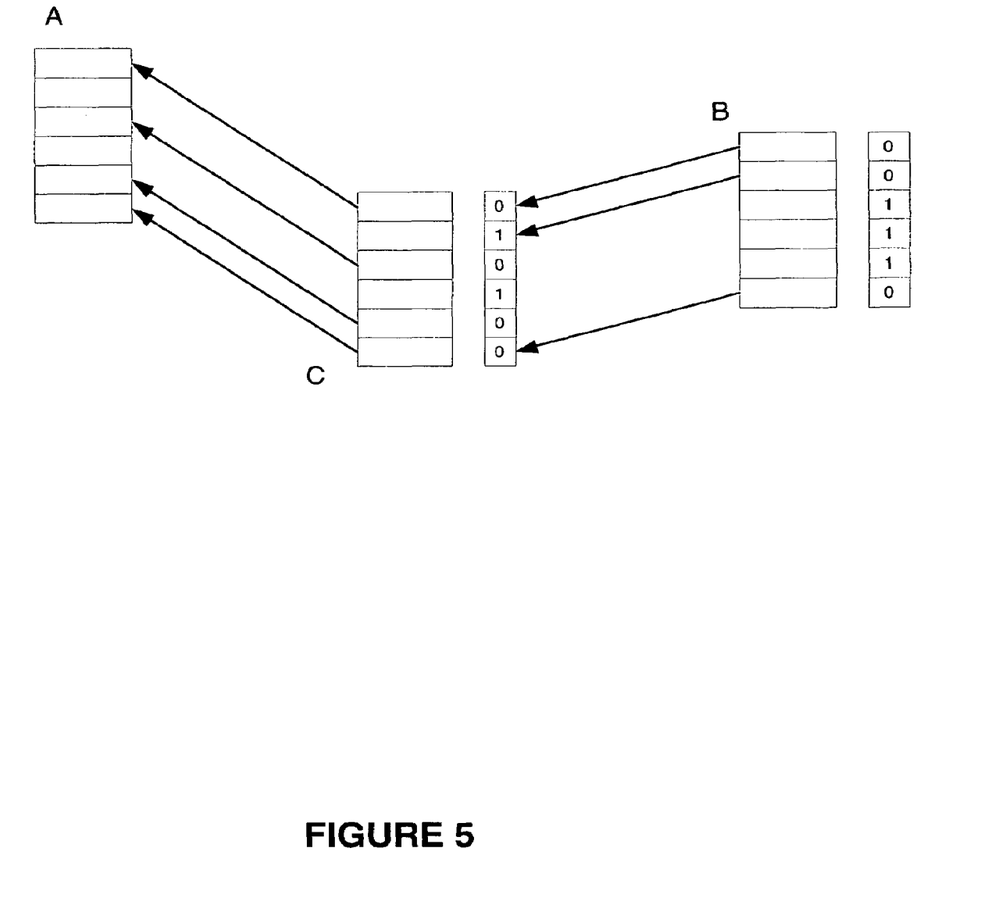
FIG. 5 shows a view of the data arrangement of FIG. 4 from which a target is to be deleted.

To make the management as close as possible to a tree scheme, the process to remove a relationship must be extended to separate the dependency. Consider the 3 disk chain of FIG. 4A again, and turning to FIG. 5, the process is as follows. In order to delete C:

First and Last grains are OK, since they are not copied at all;

4th grain is OK, since it is copied in both;

3rd and 5th grains are OK, because they are copied in B; and

2nd grain must be copied into B, since C will lose its copy.

Thus, a background copy type task is required to force a copy into B for grains which have been copied into C.

While this process takes place, grains that are copied by updates to A must be copied through to B (rather than copying to C, and then background copying to B). Updates to C are inhibited by taking the LOGICAL UNIT offline. This requires an asynchronous step in the removal of the relationship. Removing a relationship at the end of a chain does not need this asynchronous process.

Figure 6:
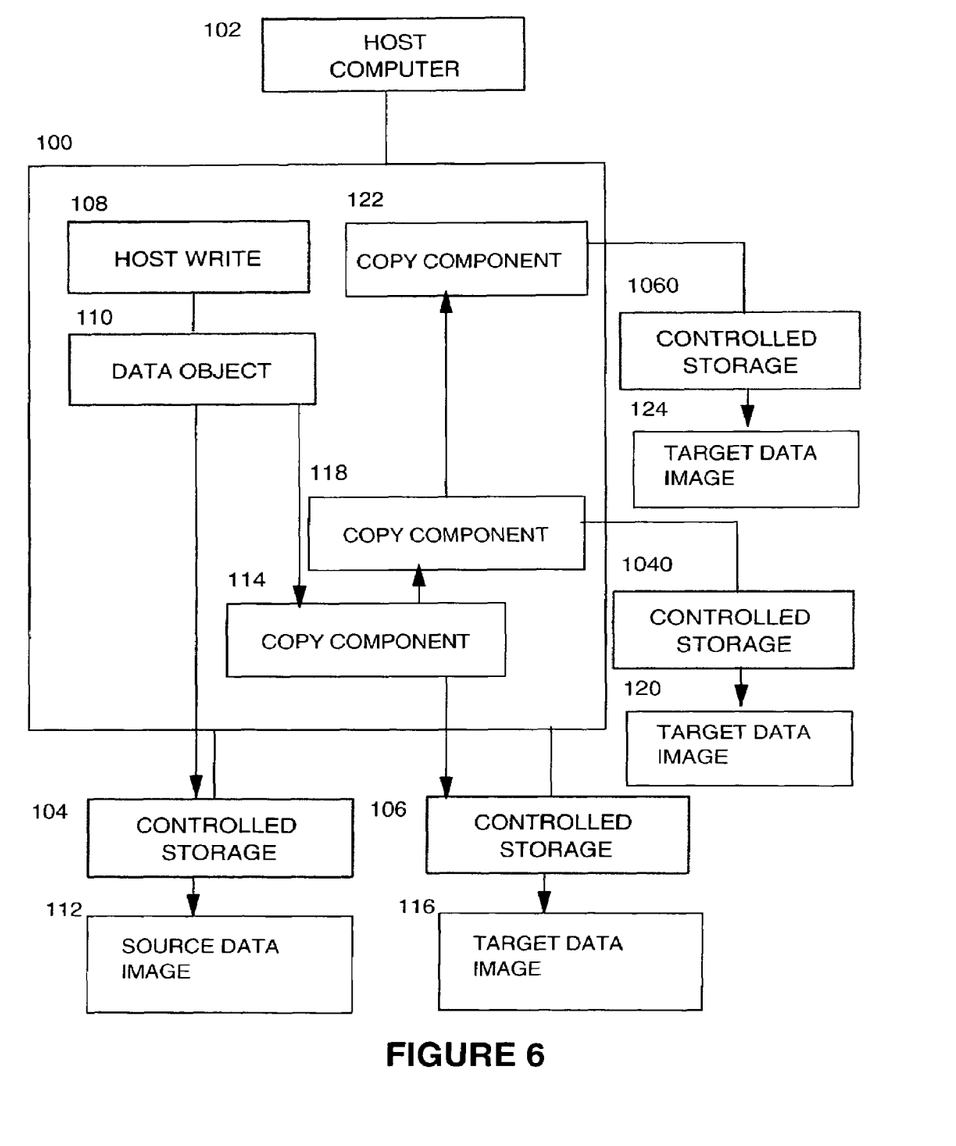
FIG. 6 is a schematic diagram illustrating a storage controller structure according to one embodiment of the present invention.

Having thus described the functioning of the cascaded FlashCopy updating process, and turning to FIG. 6, there is shown a simplified schematic diagram of a storage controller in which one embodiment of the present invention has been implemented.

In FIG. 6 is shown a storage controller 100, cooperable with host computer apparatus 102, and a plurality of controlled storage apparatus 104, 106, 1040, 1060, and comprising: a host write component 108 operable to write a data object 110 to a source data image 112 at one of said plurality of controlled storage apparatus 104, 106, 1040, 1060; a first copy component 114 responsive to a first metadata state and operable to control copying of said data object 110 to a first target data image 116 at one of said plurality of controlled storage apparatus 104, 106, 1040, 1060; a second copy component 118 responsive to a second metadata state and operable to perform one of: controlling copying of said data object 110 to a second target data image 120 at one of said plurality of controlled storage apparatus 104, 106, 1040, 1060; and causing said first copy component 114 to perform copying of said second target data image 120 to said first target data image 116; wherein said controlling copying and performing copying is independent of said host computer apparatus 102 and said host write component 108.

The storage controller 102 may comprise a further copy component 122 operable to control cascaded copying of said data object 110 to a further target data image 124 at one of said plurality of controlled storage apparatus 104, 106, 1040, 1060, independently of said host computer apparatus 102, said host write component 108 and said first and second copy components 114, 118.

Figure 7:
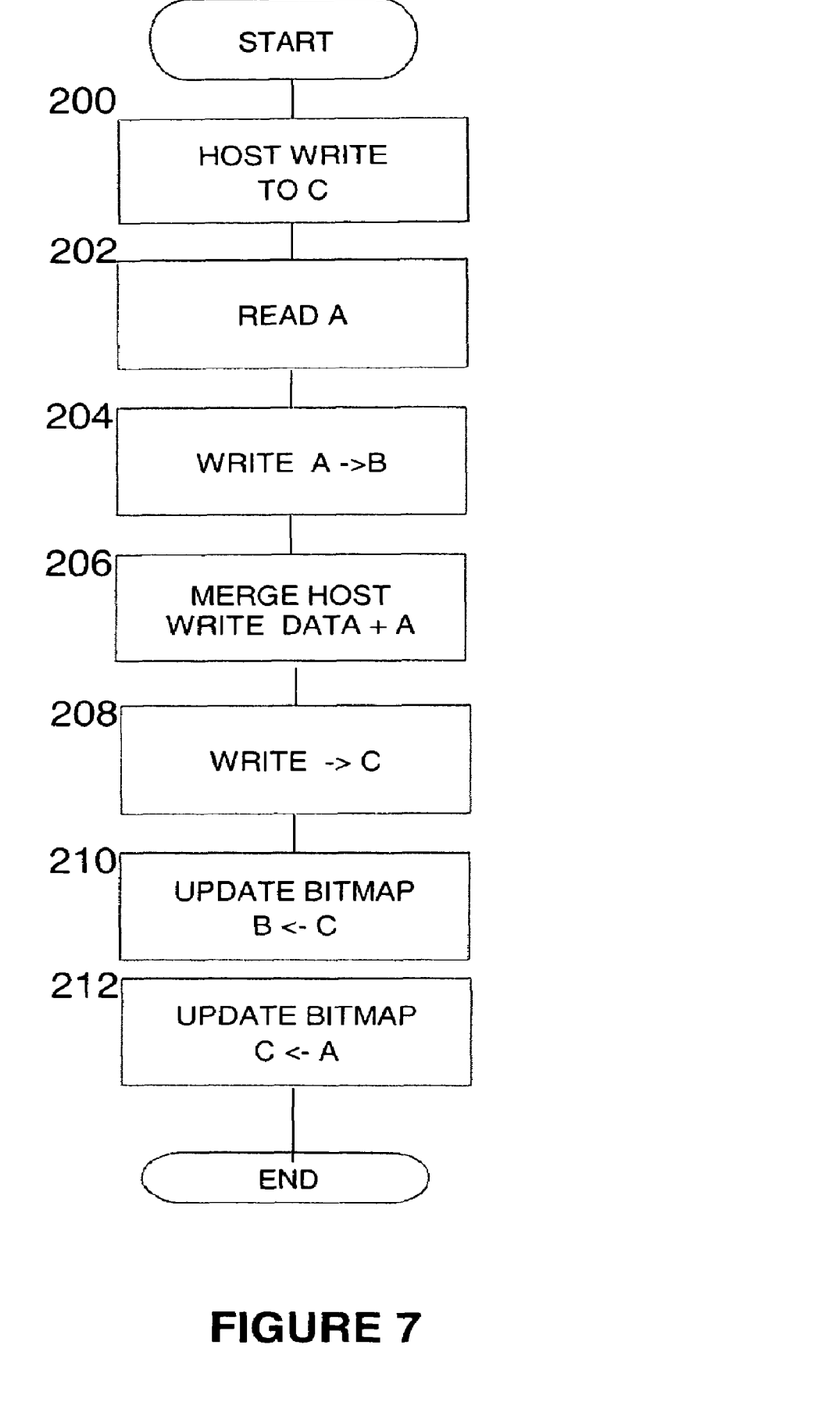
FIG. 7 shows the steps of a method according to one embodiment of the present invention.

Turning now to FIG. 7, there is shown a sequence of steps of a method according to which a certain embodiment of the present invention may be implemented in a logic arrangement of hardware, software or a combination thereof.

The method of FIG. 7 is for operating a storage controller, cooperable with host computer apparatus and a plurality of controlled storage apparatus. To illustrate the advantages of a certain embodiment of the present invention, the most complex case is shown: one in which a write action is initiated against a disk located in the middle of a cascaded set of disks.

At step 200 a host write component writes a data object to a source data image at one of the plurality of controlled storage apparatus.

In this worst case scenario, a host write is issued to the middle of the cascade, (say disk C out of disks A, C, B as shown in FIG. 4a), and the bitmaps indicate that both C has not yet been copied from A, and that also B has not yet been copied from C (which in turn would need to be read from A).

In this case, the I/Os that are required are that data for the grain is read from A at step 202, and then written to B at step 204. The new write data for C is merged with that read from A at step 206 and applied to disk C at step 208. Then the bitmaps are updated at step 210 to show that B has been copied from C, then at step 212 that C has been copied from A (the order of these bitmap updates is important). No further host I/O is needed even if there is a long cascade of disks past C that also need to be copied.

The present invention thus provides an arrangement of the FlashCopy mappings in a cascade and then functions to ensure that the number of writes needed for any host I/O is bounded at 2, regardless of the number of target disks in the cascade.

It will be readily appreciated by one of ordinary skill in the art that various further modifications to the embodiment described above will be apparent to a person of ordinary skill in the art.

It will be clear to one skilled in the art that the method of the present invention may suitably be embodied in a logic apparatus comprising logic means to perform the steps of the method, and that such logic means may comprise hardware components or firmware components.

It will be appreciated that the method described above may also suitably be carried out fully or partially in software running on one or more processors (not shown), and that the software may be provided as a computer program element carried on any suitable data carrier (also not shown) such as a magnetic or optical computer disc. The channels for the transmission of data likewise may include storage media of all descriptions as well as signal carrying media, such as wired or wireless signal media.

The present invention may suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

It will be further appreciated that embodiments of the present invention may be provided in the form of a service deployed on behalf of a customer to offer offsite disaster recovery services.

It will be appreciated that, although specific embodiments of the invention have been described herein for purposes of illustration, various modifications may be made without departing from the spirit and scope of the invention.

The invention claimed is:

1. A storage controller, comprising:
a host write component operable to write a data object to a source data image at one of a plurality of controlled storage apparatus;
a first copy component operable to copy a region of disk to a first target data image at one of said plurality of controlled storage apparatus; and
a second copy component responsive to a first metadata state and operable to perform a step selected from a group consisting of:
control copying of said region of disk that is to be updated to a second target data image at one of said plurality of controlled storage apparatus; and
causing said first copy component to perform copying of said second target data image region of disk that is to be updated to said first target data image.

2. The storage controller of claim 1, further comprising a third copy component operable to control cascaded copying by a third copy component of said region of disk that is to be updated to a third target data image at one of said plurality of controlled storage apparatus.

3. The storage controller of claim 2, further comprising a maximum number of two writes for any quantity of target images in said cascade.

4. The storage controller of claim 2, wherein at least one of the first and the second copy components and the third copy component is located at different nodes of a communications network.

5. The storage controller of claim 2, wherein the steps of controlling copying and performing copying are independent of said host computer apparatus and said host write component.

6. The storage controller of claim 1, wherein the storage controller is incorporated in a storage network.

7. The storage controller of claim 6, wherein the storage network is a storage area network.

8. The storage controller of claim 1, wherein at least one of the first and the second copy components is located at a different node of a communications network.

9. A computer program product comprising:
a computer useable medium having computer useable program code for operating a storage controller, said computer program product including:
  computer useable code for writing a data object to a source data image at one of a plurality of controlled storage apparatus;
  computer useable code for copying by a first copy component a region of a disk to a first target data image at one of said plurality of controlled storage apparatus; and
  computer useable code, responsive to a first metadata state, for performing by a second copy component a step selected from the group consisting of:
    controlled copying of said region of a disk that are to be updated to a second target data image at one of said plurality of controlled storage apparatus; and
    causing said first copy component to perform copying of said second target data image grains that are to be updated to said first target data image.

10. The computer program product of claim 9, further comprising computer useable code for cascaded copying by a third copy component of said region of disk that are to be updated to a third data image at one of said plurality of controlled storage.

11. The computer program product of claim 10, further comprising computer useable code for setting a maximum number of writes for any quantity of target images in said cascade to two.

12. The computer program product of claim 10, wherein at least one of the first and the second copy components and the third copy component is located at different nodes of a communications network.

13. The computer program product of claim 9, wherein said storage controller is incorporated in a storage network.

14. The computer program product of claim 13, wherein said storage network is a storage area network.

15. The computer program product of claim 9, wherein at least one of said first and second copy components is located at a different node of a communication network.

16. A tool for managing a storage controller comprising:
instructions for writing a data object to a source data image at one of a plurality of controlled storage apparatus;
instructions for copying a region of a disk to a first target data image at one of said plurality of controlled storage apparatus;
instructions responsive to a first metadata state for performing a step selected from the group consisting of:
  controlled copying of said data object to a second target data image at one of said plurality of controlled storage apparatus, and
  copying of said second target data image to said first target data image.

* * * * *